L. D. HOWARD.
MITERING-MACHINE.

No. 183,397.  Patented Oct. 17, 1876.

Witnesses
Grenville Lewis
F. McKenny

Inventor
Leonard D. Howard
By Hill, Ellsworth & Spear
His Attys

UNITED STATES PATENT OFFICE.

LEONARD D. HOWARD, OF ST. JOHNSBURY, VERMONT.

IMPROVEMENT IN MITERING-MACHINES.

Specification forming part of Letters Patent No. 183,397, dated October 17, 1876; application filed July 31, 1876.

*To all whom it may concern:*

Be it known that I, LEONARD D. HOWARD, of St. Johnsbury, in the county of Caledonia and State of Vermont, have invented certain new and useful Improvements in Mitering-Machines; and I do hereby declare the following to be a full, clear, and exact description of the same, reference being had to the accompanying drawings, forming part of this specification, in which—

Figure 1:
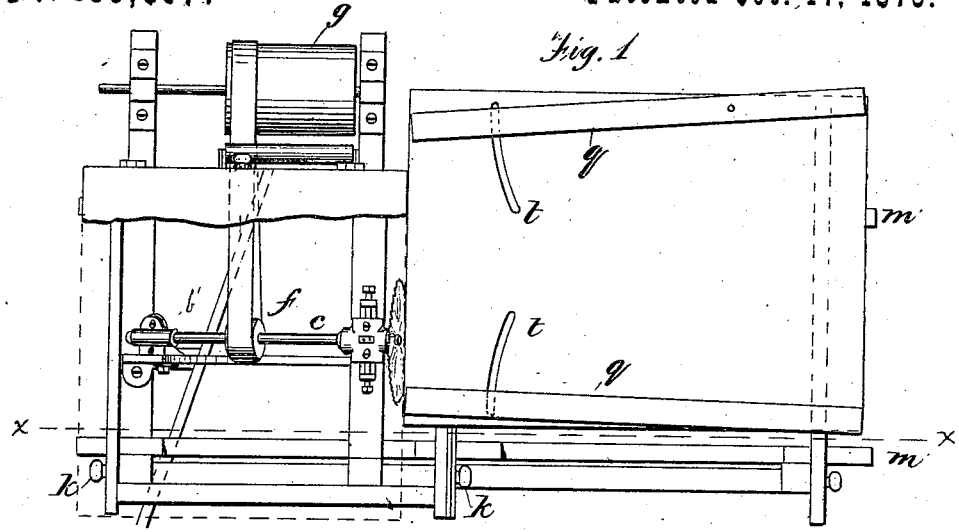
Figure 2:
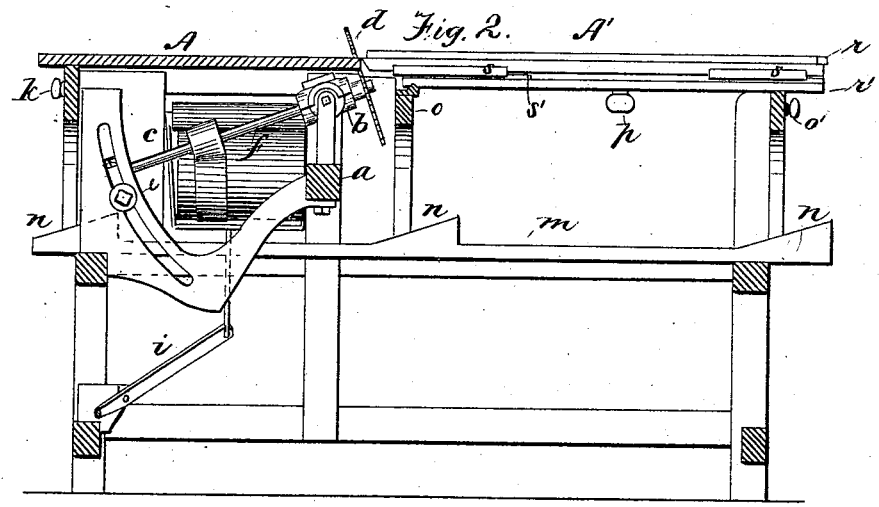
Figure 3:
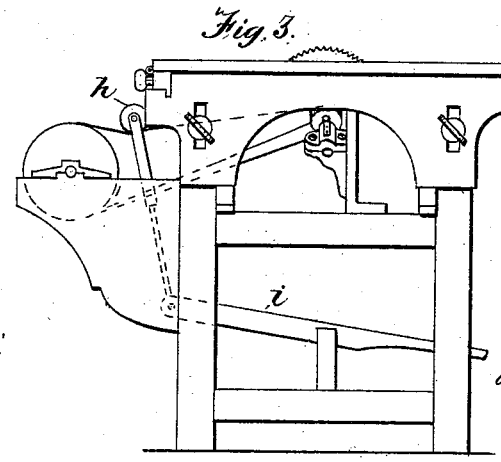

Figure 1 is a top-plan view; Fig. 2, a longitudinal section through the line $x\ x$, Fig. 1; and Fig. 3, an end view.

Similar letters of reference in the accompanying drawings denote the same parts.

My invention relates to mitering-machines which have a tipping saw; and consists of certain details in the construction of the machine, which will be more fully set forth in this specification.

To the frame at $a$ I fix a standard, in which is supported on trunnions one of the bearings $b$ of the arbor $c$ of the circular saw $d$. This bearing rocks on its trunnions with the arbor in such a way as to tip the saw from a perpendicular plane to the angle, if desired, of forty-five degrees.

The other end of the arbor turns in a bearing, $b'$, supported adjustably on a slotted arm, $e$, to which it is attached by a set-screw. The slotted arm is curved to the form of an arc, whose center is in a line with the trunnions of $b$. On the arbor of the saw is a pulley, $f$, and the saw is driven by a band from this pulley to the driving-drum $g$. A tightening-pulley, $h$, connected to a lever, $i$, serves to keep the band at proper tension. The tightening-pulley is hung upon arms connected to the frame, and is drawn down by the rod and lever; or a suitable weight may be added.

Obviously, the saw may be tipped at any angle by simply raising or lowering the bearing $b'$.

The table A is held adjustably to the frame by set-screws $k\ k$, through slots therein, and may be raised or lowered at will. A frame, $m\ m$, moved by a screw, carrying inclines $n\ n\ n$, serves to raise and lower simultaneously both this table and that on which is laid the material which is to be sawed. This table (marked A') is connected to the main frame like the table A. As the saw is mounted on a bearing behind its plane, and the table may be more or less above the center of the saw, it is necessary that the table should be adjustable in relation thereto, so that it may be moved to or from the saw when the latter is tipped one way or the other. For this reason the top is made movable sidewise on the ways $o\ o'\ o$, which are in V shape to serve as a guide-rail. Both these tables rest on the machine in such a way that when the frame which carries the inclines is forced forward the wedges raise the tables and lower them by reverse movement.

The table A' is adjustable toward and from the saw. The top $r$ rests on a frame, $r'$, and slides to and from the saw with a limited movement on ways $s\ s'$. The top is held to the frame by a set-screw, $p$. On the top are two guides, $q\ q$, pivoted at the rear, and held also by screws in curved slots $t\ t$. These serve to guide the board and hold it at any angle to saw the flare at any required angle.

I claim as my invention—

1. In a mitering-machine, the saw, which has its arbor revolving in one rocking and one movable bearing, the rocking bearing being behind the plane of the saw, in combination with a table adjustable to and from the saw, as set forth.

2. The adjustable arbor, carrying the saw, pulley $f$, band and driving pulley $g$, in combination with the tightening-pulley $h$, the parts being arranged and operating as set forth.

3. The table A', adjustable on ways $s\ s'$, and held in place by set-screws $p$, as set forth.

4. The guides $q\ q$, pivoted to the adjustable table A', with pin to move in slots $t\ t$, and in combination with the tipping-saw, as set forth.

LEONARD D. HOWARD.

Witnesses:
WALTER P. SMITH,
G. E. MANCHESTER.